(No Model.)
C. E. ROBERTS.
VEHICLE WHEEL BEARING.
No. 585,363. Patented June 29, 1897.
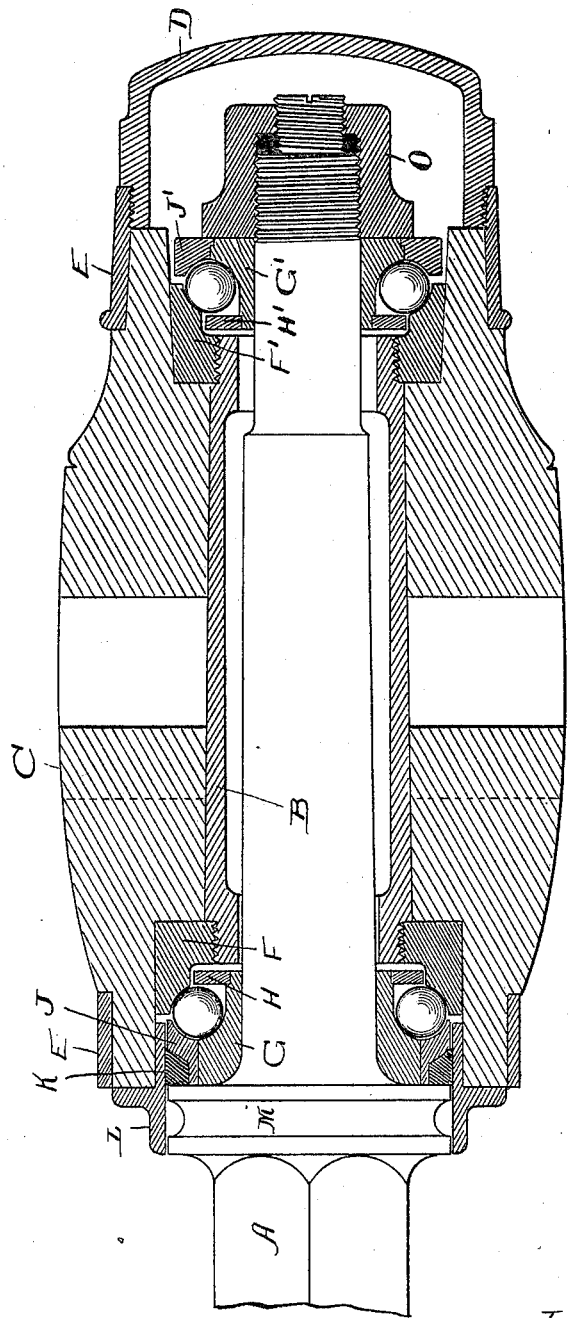
WITNESSES:
Lew. E. Curtis
H. W. Munday
INVENTOR:
CHARLES E. ROBERTS
BY Munday, Evarts & Adcock.
HIS ATTORNEYS.

UNITED STATES PATENT OFFICE.

CHARLES E. ROBERTS, OF OAK PARK, ILLINOIS.

VEHICLE-WHEEL BEARING.

SPECIFICATION forming part of Letters Patent No. 585,363, dated June 29, 1897.

Application filed June 4, 1896. Serial No. 594,250. (No model.)

*To all whom it may concern:*

Be it known that I, CHARLES E. ROBERTS, a citizen of the United States, residing in Oak Park, in the county of Cook and State of Illinois, have invented a new and useful Improvement in Vehicle-Wheel Bearings, of which the following is a specification.

This invention is designed to render the cleaning of the balls and their ways in the ball-bearings of carriages and other vehicles a more easy operation than it is in prior constructions, and I accomplish the purpose had in view by attaching the ball-holding devices to the cones instead of the cups, as in the common construction. In consequence of this change an outer annulus of each cone may be left open, so as to expose the entire series of balls when the wheel is removed from the axle, and thus permit the cleaning of both the cone and the balls by flushing with water or other cleansing fluid and give abundant opportunity to drain off all the cleansing fluid. The balls are also confined upon the cones by my improved construction and do not need to be taken from it when it is removed from the bearing, and thus a frequent cause of annoyance is obviated.

The nature of my improvement is disclosed fully in the accompanying drawing, wherein I give a longitudinal section of my improved bearing.

In said drawing, A represents the axle; B, the box; C, the hub; D, the dust-cap, and E E the hub-bands, one of which is threaded interiorly and receives the dust-cap. The cups are shown at F F' and are threaded upon the box, as plainly indicated, while the cones G G' are made to fit the axle. H and J are respectively a ring and cap upon the inner cone, and H' and J' are respectively a ring and cap upon the outer cone for confining the balls upon the cones, the rings H and H' being shaped like flat washers and secured fast upon the smaller ends of the cones and the caps J and J' surrounding the larger ends of the cones, as shown, and removable therefrom. The cap J is also recessed exteriorly to give room to the packing K, which is employed to exclude water, &c., from the inner set of balls.

The sleeve L is attached to the inside of the hub and covers the water-diverting groove M upon the axle.

When the wheel is removed from the axle, the inner cone, with its balls, will remain on the axle, and the outer cone and balls may then be readily detached from the wheel, so that all of them may be cleaned in the manner stated. If it is desired to replace the balls, it may be done readily by detaching the cap J or J'.

The nut O is threaded upon the outer end of the axle and serves both to keep the wheel in place and as a means of adjusting the bearings.

My invention not only permits the retaining of the balls under perfect control when the cones are removed from the axle, but in the case of the outer bearing access can be had to the balls for cleaning, &c., by simply detaching the cap of that bearing and without removing the cone.

I claim—

In a ball-bearing, the combination with the balls, of a cone having a retaining device mounted thereon at each side of the balls and serving to confine them upon the cone when the latter is removed from the axle, said retaining device at the outer side of the balls being made removable from the cone to allow the release of the balls and also to give access to them while upon the axle, substantially as specified.

CHARLES E. ROBERTS.

Witnesses:
 EDW. S. EVARTS,
 H. M. MUNDAY.